(12) United States Patent
Haverinen et al.

(10) Patent No.: US 9,698,872 B2
(45) Date of Patent: Jul. 4, 2017

(54) METHODS AND APPARATUS FOR IMPROVING REMOTE NFC DEVICE DETECTION USING A LOW POWER OSCILLATOR CIRCUIT

(71) Applicant: QUALCOMM Incorporated, San Diego, CA (US)

(72) Inventors: Anssi Kaleva Haverinen, San Diego, CA (US); Todd Reynolds, San Diego, CA (US); Angelica Wong, San Jose, CA (US); Roger Brockenbrough, Los Gatos, CA (US); Sang-Min Lee, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 13/920,670

(22) Filed: Jun. 18, 2013

(65) Prior Publication Data

US 2014/0370803 A1 Dec. 18, 2014

(51) Int. Cl.
*H04B 5/00* (2006.01)

(52) U.S. Cl.
CPC ......... *H04B 5/0031* (2013.01); *H04B 5/0056* (2013.01); *H04B 5/0081* (2013.01); *Y02B 60/50* (2013.01)

(58) Field of Classification Search
None
See application file for complete search history.

(56) References Cited

U.S. PATENT DOCUMENTS

| 5,751,196 A | 5/1998 | Neudecker | |
| 6,124,764 A * | 9/2000 | Haartsen | H03J 7/06 327/106 |
| 6,333,939 B1 * | 12/2001 | Butler | G06F 1/08 370/350 |
| 6,552,661 B1 * | 4/2003 | Lastinger | G06K 7/0008 340/572.1 |
| 7,013,119 B2 | 3/2006 | Yamauchi et al. | |
| 7,391,273 B2 | 6/2008 | Seki et al. | |
| 8,258,881 B2 | 9/2012 | Walley | |
| 2006/0265181 A1 * | 11/2006 | Stewart | G06K 7/0008 702/178 |

(Continued)

FOREIGN PATENT DOCUMENTS

WO WO-00/44097 A1 7/2000
WO WO-2009/128032 A1 10/2009

OTHER PUBLICATIONS

International Search Report and Written Opinion—PCT/US2014/042228—ISA/EPO—Oct. 13, 2014. (10 total pages).

*Primary Examiner* — Zhiyu Lu
(74) *Attorney, Agent, or Firm* — Arent Fox, LLP

(57) ABSTRACT

A method, an apparatus, and a computer program product for inductive communication are provided in connection with providing mechanisms for detecting a remote NFC device without excessive power consumption. In one example, a communications device is equipped to monitor frequency oscillations associated with a NFC antenna using a calibrated LPO, determine that a number of occurrences of the frequency oscillations from a reference frequency is greater than a frequency deviation threshold, and perform a NFC polling procedure in response to the determination.

36 Claims, 7 Drawing Sheets

(56) References Cited

U.S. PATENT DOCUMENTS

| | | | |
|---|---|---|---|
| 2007/0222529 A1* | 9/2007 | Carichner | H03L 7/099 331/44 |
| 2007/0297356 A1 | 12/2007 | Rofougaran | |
| 2008/0272826 A1* | 11/2008 | Smit | G06F 1/3215 327/509 |
| 2010/0231307 A1* | 9/2010 | Walley | H03L 7/00 331/47 |
| 2011/0059694 A1* | 3/2011 | Audic | H04B 5/00 455/41.1 |
| 2011/0066874 A1* | 3/2011 | Shen | H04W 52/028 713/400 |
| 2012/0194322 A1* | 8/2012 | Batra | G06K 19/0723 340/10.33 |
| 2012/0203620 A1* | 8/2012 | Dobyns | G06Q 30/0234 705/14.38 |
| 2013/0335200 A1* | 12/2013 | Jonely | G06K 7/10128 340/10.5 |
| 2014/0167866 A1* | 6/2014 | Vasishtha | H03B 5/36 331/44 |

* cited by examiner

METHODS AND APPARATUS FOR IMPROVING REMOTE NFC DEVICE DETECTION USING A LOW POWER OSCILLATOR CIRCUIT

BACKGROUND

Field

The disclosed aspects relate generally to communications between devices and specifically to methods and systems for improving remote near field communication (NFC) device detection through use of an oscillator circuit connected to an NFC antenna and matching network.

Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

When using NFC, it is desirable for a poller device to be able to detect the proximity of a listener device (e.g., a passive tag, an active device functioning as a passive tag, etc.) using as little power as possible. Power is a particular concern since, in typical applications, the poller device spends most of its time in the listening mode (cycling between listen and sleep with some duty cycle).

Currently, the poller device may fully activated (TX+RX antennas) for transmission of a carrier signal and listening for a load modulation response. Alternatively, the poller device may activate the TX antenna and monitor the power consumption, and/or the poller device may activate the TX antenna and monitor power consumption over a frequency sweep. In this case, remote NFC device detection may be based on a comparison on the oscillator frequency to a known frequency reference. When an NFC reader chip is integrated in a wireless communications device (WCD), it may use a dedicated crystal oscillator or share a crystal oscillator with other chips and subsystems. A high quality crystal oscillator may provide a high quality reference signal, but also may consume a significantly high current. Currently, a NFC chip may periodically wake up from a sleep state to perform tag detection. In such an aspect, the NFC chip may use either a shared system low power reference clock, or an integrated low crystal-less low power oscillator (LPO), to measure time between wake ups. Thereafter, the NFC chip may turn on the high quality crystal oscillator for the remote NFC device detection. As such, the impact of the crystal oscillator to average power consumption may be calculated as the power used by the crystal oscillator multiplied by the detection time and divided by the wake up interval.

Thus, improved apparatuses and methods providing mechanisms for detecting a remote NFC device without excessive power consumption may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing mechanisms for detecting a remote NFC device without excessive power consumption. In one example, a communications device is equipped to monitor frequency oscillations associated with a NFC antenna using a calibrated LPO, determine that a number of occurrences of the frequency oscillations from a reference frequency is greater than a frequency deviation threshold, and perform a NFC polling procedure in response to the determination.

According to related aspects, a method for providing mechanisms for detecting a remote NFC device without excessive power consumption is provided. The method can include monitoring frequency oscillations associated with a NFC antenna using a calibrated LPO. Further, the method can include determining that a number of occurrences of the frequency oscillations from a reference frequency is greater than a frequency deviation threshold. Moreover, the method may include performing a NFC polling procedure in response to the determination.

Another aspect relates to a communications apparatus enabled to provide mechanisms for detecting a remote NFC device without excessive power consumption. The communications apparatus can include means for frequency oscillations associated with a NFC antenna using a calibrated LPO. Further, the communications apparatus can include means for determining that a number of occurrences of the frequency oscillations from a reference frequency is greater than a frequency deviation threshold. Moreover, the communications apparatus can include means for performing a NFC polling procedure in response to the determination.

Another aspect relates to a communications apparatus. The apparatus can include a processing system, a calibrated LPO circuit, a NFC antenna, and a matching network. In an aspect, the calibrated LPO circuit may be connected to the NFC antenna and matching network, and be configured to monitor frequency oscillations. Further, the processing system may be configured to determine that a number of occurrences of the frequency oscillations from a reference frequency is greater than a frequency deviation threshold. Moreover, the processing system may further be configured to perform a NFC polling procedure in response to the determination.

Still another aspect relates to a computer program product, which can have a computer-readable medium including code for monitoring frequency oscillations associated with a NFC antenna using a calibrated LPO. Further, the computer-readable medium may include code for determining that a number of occurrences of the frequency oscillations from a reference frequency is greater than a frequency deviation threshold. Moreover, the computer-readable medium can include code for performing a NFC polling procedure in response to the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Figure 1:
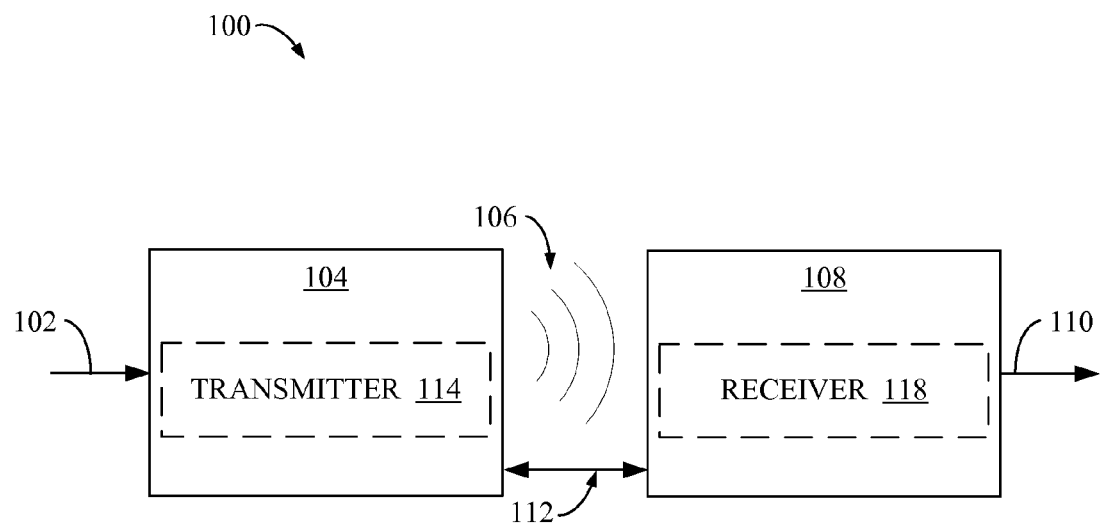
FIG. 1 is a block diagram of a wireless communication system according to an aspect.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field, a coupling mode may be developed between the transmit antenna 114 and the receive antenna 118. The area around the antennas 114 and 118 where this near-field coupling may occur is referred to herein as a coupling-mode region.

Figure 2:
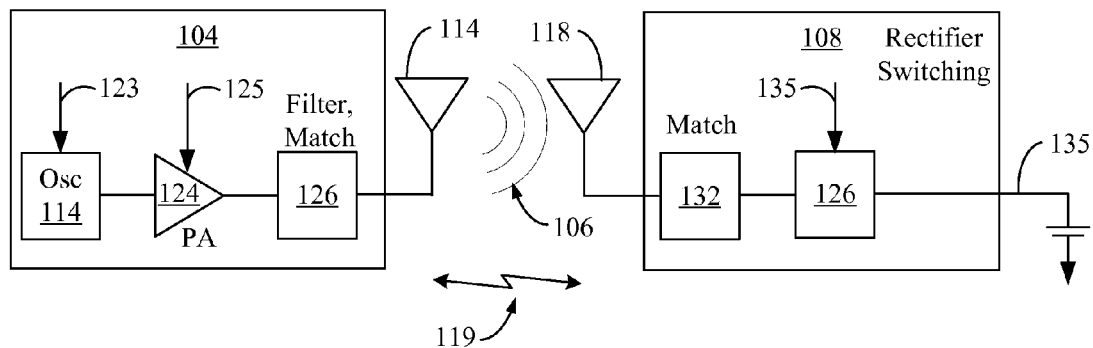
FIG. 2 is a schematic diagram of a wireless communication system, according to an aspect.

FIG. 2 is a schematic diagram of an example near field inductive communications system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
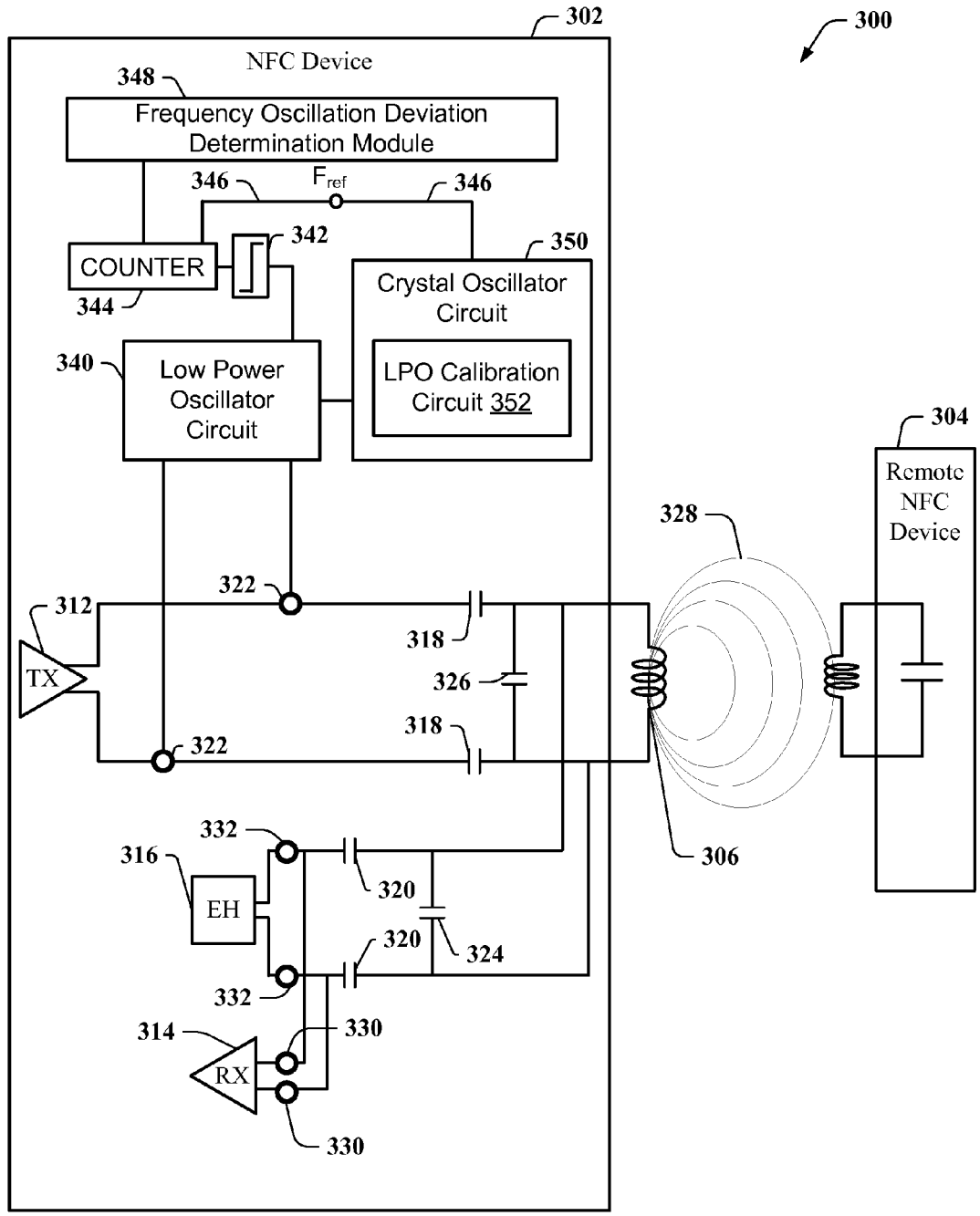
FIG. 3 is a block diagram of a NFC device configuration in an NFC environment with a calibrated LPO, according to an aspect.

With reference to FIG. 3, a block diagram of a communication network 300 according to an aspect is illustrated. Communication network 300 may include a NFC device 302 and a remote NFC device 304 that may be configured to communication using NFC. NFC device 302 may include a NFC antenna coil 306 configured to facilitate NFC communications with remote NFC device 304.

As part of NFC communications, NFC antenna coil 306 may generate an electromagnetic field 328 in the area around the NFC antenna coil 306. The strength of the field may depend on the power source and the size and number of turns in NFC antenna coil 306. Further, impedance mismatches may cause a range of amplitude/phase changes dependant on size and inductance of NFC antenna coil 306 in the magnetic field 328. Capacitor 326 may be connected in parallel with the NFC antenna coil 306, where a transmitter component 312 and capacitors 318 may form an RLC oscillator establishing a resonant circuit with a frequency that corresponds to a transmission frequency (e.g., 13.56 MHz) used by the NFC device 302. Because the wavelength of the frequency used is several times greater than the close proximity distance between the NFC antenna coil 306 and the remote NFC device's 304 antenna coil, the electromagnetic field can be treated as an alternating magnetic field 328. This region of close proximity is referred to as the near field region. The NFC device 302 and remote NFC device 304 may be linked by their mutual inductance, as in a transformer, with the primary coil being the NFC antenna coil 306 and the secondary coil being the remote NFC device's 304 coil. The alternating magnetic field 328 penetrates the remote NFC device's 304 coil when it is in the near field region, inducing an alternating current in the remote NFC device's 304 coil.

When operating in a listening mode, the NFC antenna coil 306, capacitors 320, (optional) energy harvester (EH) 316 and a receiver component 314 may form an RLC oscillator establishing a resonant circuit tuned to the transmission frequency of the remote NFC device 304. When the resonant frequency of the remote NFC device 304 corresponds to the transmission frequency of the NFC device 302, this draws energy from the magnetic field 328. This additional power consumption manifests itself in the NFC device 302 as a voltage drop through the supply current to the NFC antenna coil 306. Receiver component 314 may represent a variable load resistance to the NFC antenna coil 306. If the receiver component 314 switches its variable load resistance on and off, this changes the resonant frequency so that it does not correspond to the transmission frequency of the remote NFC device 304, which then may detected as a voltage change by the remote NFC device 304. In this manner, the receiver component 314 can use its stored data to modulate the load resistance on the NFC antenna coil 306 and transfer its stored data from the remote NFC device 304. This describes the basic, one-way "listening", such as would be used in an identity card, tag, etc. transmitter component 312 may be used with receiver component 314 for two-way "read-write" communications.

Further, the various components (e.g., transmitter component 312, receiver component 314, EH 316 may be connected to the NFC antenna (e.g., NFC coil 306) through various pins. In such an aspect, the pins may be associated with the various component paths (e.g., transmitter path 322, receiver path 330, EH path 332, etc.).

Further, NFC device 302 may include an electromagnetic interference (EMI) filter (not shown) between transmitter path pins 322 and the NFC coil 306. In such an aspect, the EMI filter may include various resistors, capacitors, and inductors configured in such a manner as to filter EMI. Further, in such a configuration, NFC device 302 may include additional capacitors associated with other components (e.g., receiver component 314).

In an aspect, the NFC device 302 may further include a low power oscillator (LPO) circuit 340, a squaring buffer 342, a frequency counter 344, a crystal oscillator circuit 350, and a frequency oscillation deviation determination module 348. In the depicted NFC device 302 configuration, the LPO circuitry 340 may be connected through transmitter path pins 322. In an aspect, a squaring buffer 342 may be connected to LPO circuitry 340. In such an aspect, the squaring buffer 342 may be attached to any convenient node in the LPO circuitry 340. Further, a frequency counter 344 may be configured to measure the frequency of a signal generated by the LPO circuitry 340 relative to some fixed reference frequency 346. In such an aspect, the LPO circuitry 340 design may provide positive feedback at some resonance in the matching network and antenna 306 to produce oscillation at a frequency which is a function of the antenna 306 impedance.

Generally, a LPO circuitry 340 may be comparatively less accurate than a crystal oscillator 350. Inaccuracies in a LPO circuitry 340 may be divided into a random phase jitter component, a manufacturing process variation frequency component, and temperature frequency variation component. Manufacturing and temperature variation can be reduced by calibrating the LPO frequency by comparing it to a reference frequency as measured by a high quality crystal oscillator 350. As frequency drift over time may be dominated by temperature variation, and since the rate of temperature change over time in silicon chips is a fairly slow process (in the range of one Kelvin per second), the LPO frequency can be kept within a threshold range with calibration. In an aspect, LPO calibration circuit 352 may calibrate (e.g., periodically) the LPO circuitry 340 based on the reference frequency 346 as measured by the crystal oscillator circuit 350. In another aspect, LPO calibration circuit 352 may perform calibration when another subsystem (e.g., Bluetooth, etc.) turns on the crystal oscillator circuit 350. In another aspect, LPO calibration circuit 352 may perform calibration every few wake up intervals (subrated interval).

Further, use of the LPO circuitry 340, in comparison to use of a crystal oscillator circuit 350, may reduce tag detection latency. For example, the LPO may be run substantially continuously. In such an aspect, there may be increased power consumption during sleep state, but the maximum tag detection latency is reduced from WAKE-UP_INTERVAL+DETECTION_TIME to DETECTION_TIME. In another aspect, the NFC chip may be woken up only for LPO circuitry 340 calibration or when a remote NFC device 304 is detected. In another aspect, the LPO circuitry 340 may be used to monitor NFC antenna coil 306 frequency oscillations during each wake-up cycle.

Still further, with respect to FIG. 3, the LPO circuitry 340 may be connected to any port 322, 330, 332 of the matching network already in use for normal NFC operation (TX 322, RX 330, EH 332) and/or a custom port (not shown) may be used for the LPO circuitry 340. In an operational aspect, the receiver path pins 330 may not be used for connection of the LPO circuitry 340 as it may be exposed to high voltage at the antenna 306 due either to the incoming field 328 or due to the outgoing signal comminuted through the transmitter path 322 which experiences a voltage gain across the matching network from the transmitter path pins 322 to the receiver path pins 330. Depending on the impedance at path pins (322, 332, 332), an appropriate oscillator topology can be selected to satisfy loop conditions for oscillation.

The antenna 306 impedance is a function of proximity to a coupled device 304. In other words, antenna 306 inductance may change as coupling to the antenna 306 inductance on another device 304 increases. Further, such a change in inductance may cause a shift to a different oscillation frequency (measured by LPO circuitry 340). AS noted above, detection sensitivity in the LPO circuitry 340 may be based on the accuracy of the frequency measurement (e.g., reference frequency 346 as calibrated by crystal oscillator 350). Such accuracy may be increased through use of an averaging period. In another aspect, LPO calibration circuit 352 may use an adaptive algorithm to determine a frequency deviation count threshold to more accurately calibrate the LPO circuitry 340.

In an operational aspect, use of LPO circuitry 340 can assist in determining when there is a change in the environment of the antenna 306 which causes a shift in impedance and/or a change in an oscillating frequency. In an aspect, the LPO circuitry 340 may operate with a repetition rate and a resulting count value detected by frequency counter 344 may be compared across cycles (e.g., from one operating cycle to the next). Further, in the operational aspect, frequency oscillation deviation determination module 348 may determine when a change in the count value is greater than a frequency deviation threshold. In such an aspect, frequency oscillation deviation determination module 348 may prompt the NFC device 302 to perform a full NFC polling procedure to determine whether the frequency deviation is based on the presence of a remote NFC device 304. As such, a NFC device 302 may reduce power consumption because the full NFC polling procedure may not be enabled until a shift in impedance is detected using the LPO circuitry 340.

Figure 4:
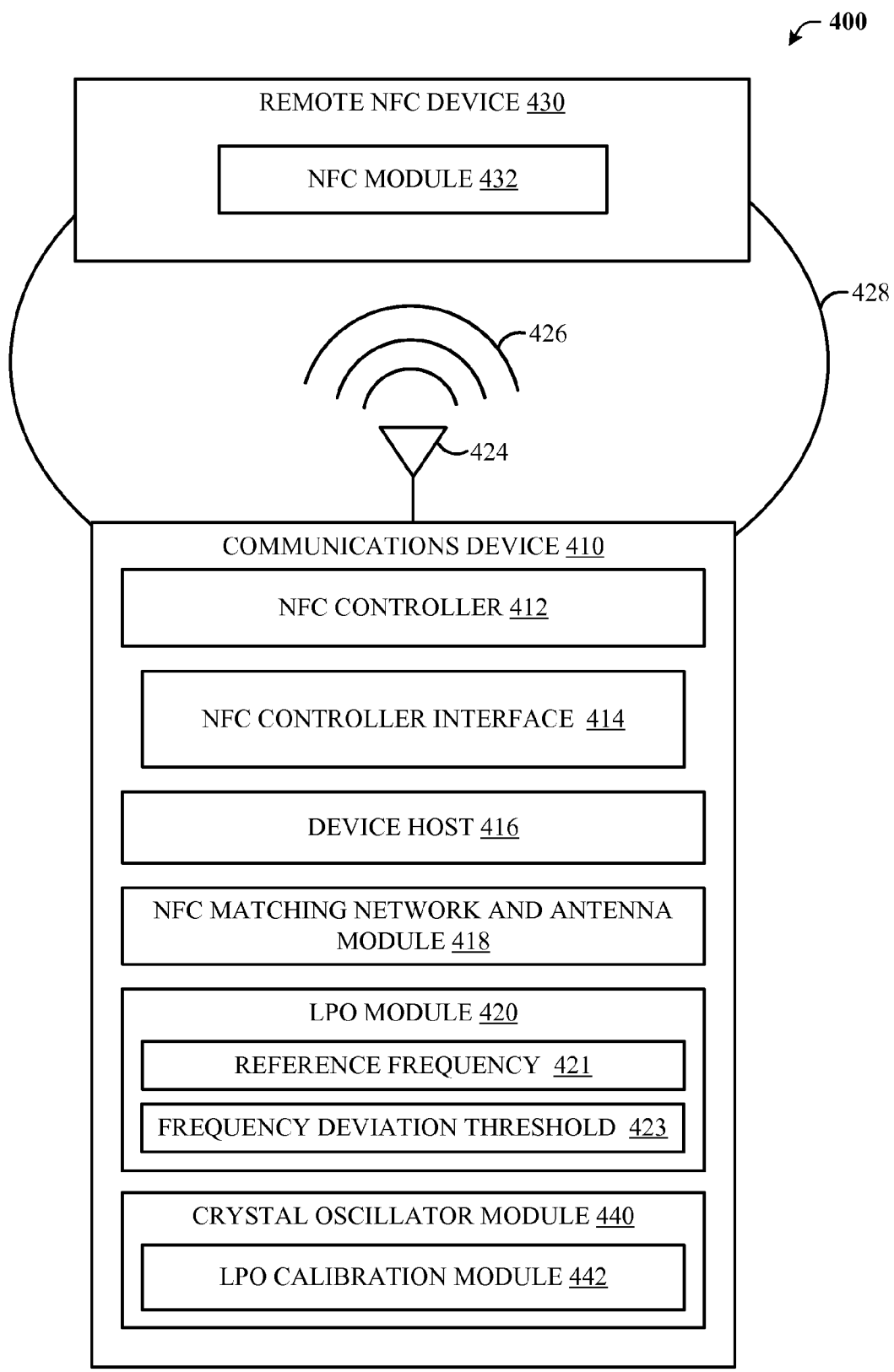
FIG. 4 is a block diagram of a NFC environment, according to an aspect.

With reference to FIG. 4, a block diagram of a communication network 400 according to an aspect is illustrated. Communication network 400 may include communications device 410 which, through antenna 424, may be in inductive communication with a remote NFC device 430 using one or more NFC technologies 426 (e.g., NFC-A, NFC-B, NFC-F, etc.). In another aspect, communications device 410 may be configured to be connected to an access network and/or core network (e.g., a CDMA network, a GPRS network, a UMTS network, and other types of wireline, wireless, and induction based communications networks).

In an aspect, communications device 410 may include a NFC controller 412, a NFC controller interface (NCI) 414, and a device host 416. In an aspect, communications device 410 may further include a NFC matching network and antenna module 418, an LPO module 420, and a crystal oscillator module 440. In operation, device host 416 may be configured to obtain, through NCI 414, and NFC Controller 412 information from remote NFC device 430 through NFC module 432 associated with remote NFC device 430.

As part of determining whether a remote NFC device 430 is within the operating volume 428 of communications device 410, LPO module 420 may be configured to detect frequency deviations, associated with NFC matching network and antenna module 418, that differ from a reference frequency 421 by more than a frequency deviation threshold 423. Further, crystal oscillator module 440 may be configured to measure a comparatively more accurate reference frequency than LPO module 420. In such an aspect, LPO calibration module 442 may use the comparatively more accurate reference frequency to calibrate LPO module 420.

In operation, LPO module 420 can assist in determining when there is a change in the environment of the antenna which causes a shift in impedance. Further, in the operational aspect, when LPO module 420 detect a change from reference frequency 421 in the count value is greater than a frequency deviation threshold 423, the communications device 410 may be prompted to perform a full NFC polling procedure to determine whether the frequency deviation is based on the presence of a remote NFC device 430.

Accordingly, communication network 400 provides an environment in which a communications device 410 may be configured to improve power consumption while attempting to detect a remote NFC device 430 in an operating volume 428.

Figure 5:
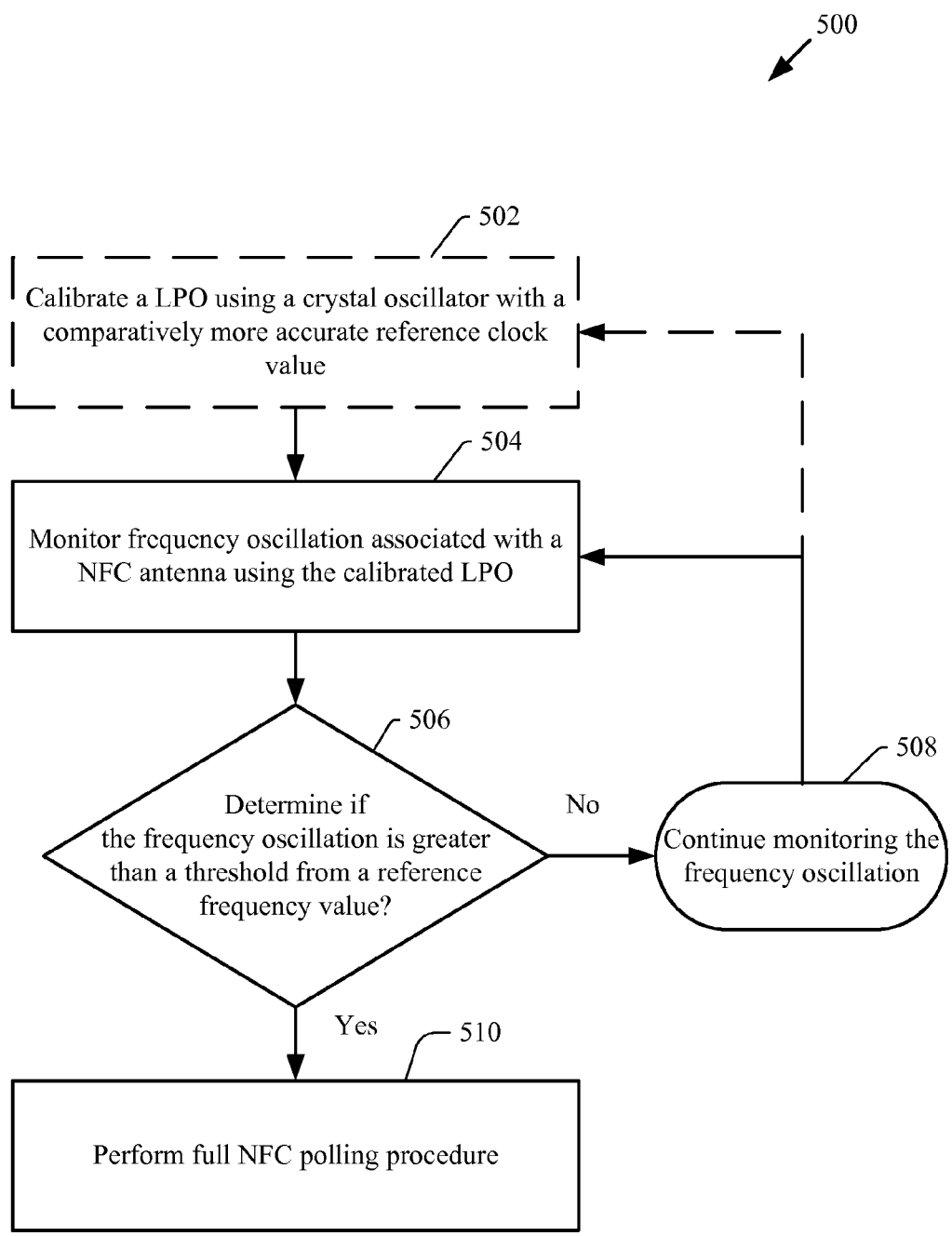
FIG. 5 is a flowchart diagram describing an example for improving remote NFC device detection through frequency oscillation monitoring, according to an aspect.

FIG. 5 illustrates methodologies in accordance with various aspects of the presented subject matter. While the methodologies are shown and described as a series of acts or sequence steps for the purposes of simplicity of explanation, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 5, a flowchart describing an example process 500 for improving remote NFC device detection using a LPO is illustrated.

At block 502, the NFC device may calibrate a LPO for use to detecting the presence of a remote NFC device. Inaccuracies in a LPO may be divided into a random phase jitter component, a manufacturing process variation frequency component, and temperature frequency variation component. Manufacturing and temperature variation can be reduced by calibrating the LPO frequency by comparing it to the high quality crystal reference frequency. As frequency drift over time may be dominated by temperature variation, and since the rate of temperature change over time in silicon chips is a fairly slow process (in the range of one Kelvin per second), the LPO frequency can be kept within a threshold range with calibration. In an aspect, the LPO reference frequency may be periodically calibrated with a higher quality clock. In another aspect, the LPO calibration may be performed when another subsystem (e.g., Bluetooth, etc.) turns on the crystal oscillator. In another aspect, the LPO calibration may be performed every few wake up intervals (subrated interval).

At block 504, a NFC device may monitor frequency oscillations associated with a NFC antenna using the calibrated LPO. In an aspect, the frequency oscillations may be monitored through use of the LPO connected to the NFC antenna and a frequency deviation counter connected to the oscillator. In such an aspect, the frequency deviation counter may be connected to the LPO through a squaring buffer. Further, the frequency deviation counter may count deviations from a reference frequency (e.g., the operational frequency of the NFC antenna). In an aspect, using a LPO for a reference frequency allows low power remote NFC device detection solution, where LPO is running continuously. In such an aspect, there may be increased power consumption during sleep state, but the maximum tag detection latency is reduced from WAKEUP_INTERVAL+DETECTION_TIME to DETECTION_TIME. Further, in such an aspect, the NFC chip may be woken up only for LPO calibration or when the tag is detected. In another aspect, the LPO may be used to monitor NFC antenna frequency oscillations during each wake-up cycle.

At block 506, the NFC device may determine whether a remote NFC device is potentially within the operating volume of the NFC device based on the frequency deviations from the reference frequency. In an aspect, the frequency deviations may be averaged over time to improve potential accuracy of the frequency deviation counter. In another aspect, frequency deviation may be associated with a change in inductance associated with the NFC device antenna which in turn may be associated with a change in the operating volume (e.g., the presence of a remote NFC device, a piece of metal, a hand, etc.)

If at block 506, the NFC device determines that the deviations from the reference frequency do not exceed the frequency deviation threshold, then at block 508, the NFC device may continue monitoring the NFC antenna using the LPO and may return to block 502 or block 504.

By contrast, if at block 506, the NFC device determines that the deviations from the reference frequency exceed the frequency deviation threshold, then at block 510, the NFC may perform a full NFC polling procedure.

Figure 6:
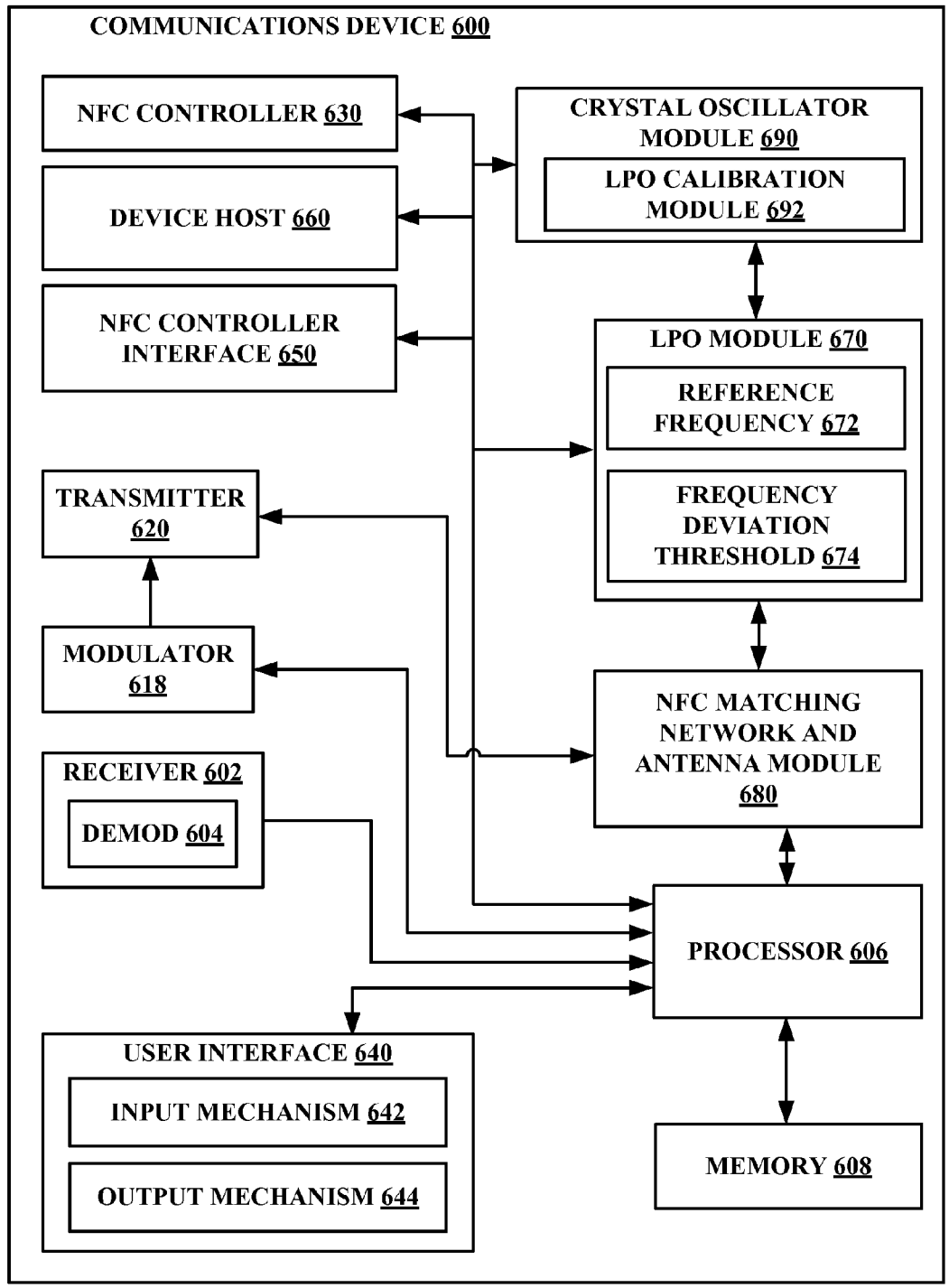
FIG. 6 is a functional block diagram example architecture of a communications device, according to an aspect.

While referencing FIG. 4, but turning also now to FIG. 6, an example architecture of communications device 600 is illustrated. As depicted in FIG. 6, communications device 600 includes receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can include a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally include memory 608 that is operatively coupled to processor 606 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, at least one of processor 606, NFC matching network and antenna module 680, or LPO module 670 can provide means for monitoring frequency oscillations associated with a NFC antenna using a calibrated LPO, means for determining that a number of occurrences of the frequency oscillations from a reference frequency is greater than a frequency deviation threshold, and means for performing a NFC polling procedure in response to the determination.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include NFC controller interface (NCI) 650. In an aspect, NCI 650 may be configured to enable communications between a NFC controller 630 and device host 660.

Communications device 600 may include NFC matching network and antenna module 680, or LPO module 670. As part of determining whether a remote NFC device is within the operating volume of communications device 600, LPO module 670 may be configured to detect frequency deviations, associated with NFC matching network and antenna module 680, that differ from a reference frequency 672 by more than a frequency deviation threshold 674. Further, crystal oscillator module 690 may be configured to measure a comparatively more accurate reference frequency than LPO module 670. In such an aspect, LPO calibration module 692 may use the comparatively more accurate reference frequency to calibrate LPO module 670.

In operation, LPO module 670 can assist in determining when there is a change in the environment of the antenna which causes a shift in impedance. Further, in the operational aspect, when LPO module 670 detect a change from reference frequency 672 in the count value is greater than a frequency deviation threshold 674, the communications device 600 may be prompted to perform a full NFC polling procedure to determine whether the frequency deviation is based on the presence of a remote NFC device.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, etc. In the illustrated aspects, the output mechanism 644 may include a display configured to present media content that is in image or video format or an audio speaker to present media content that is in an audio format.

Figure 7:
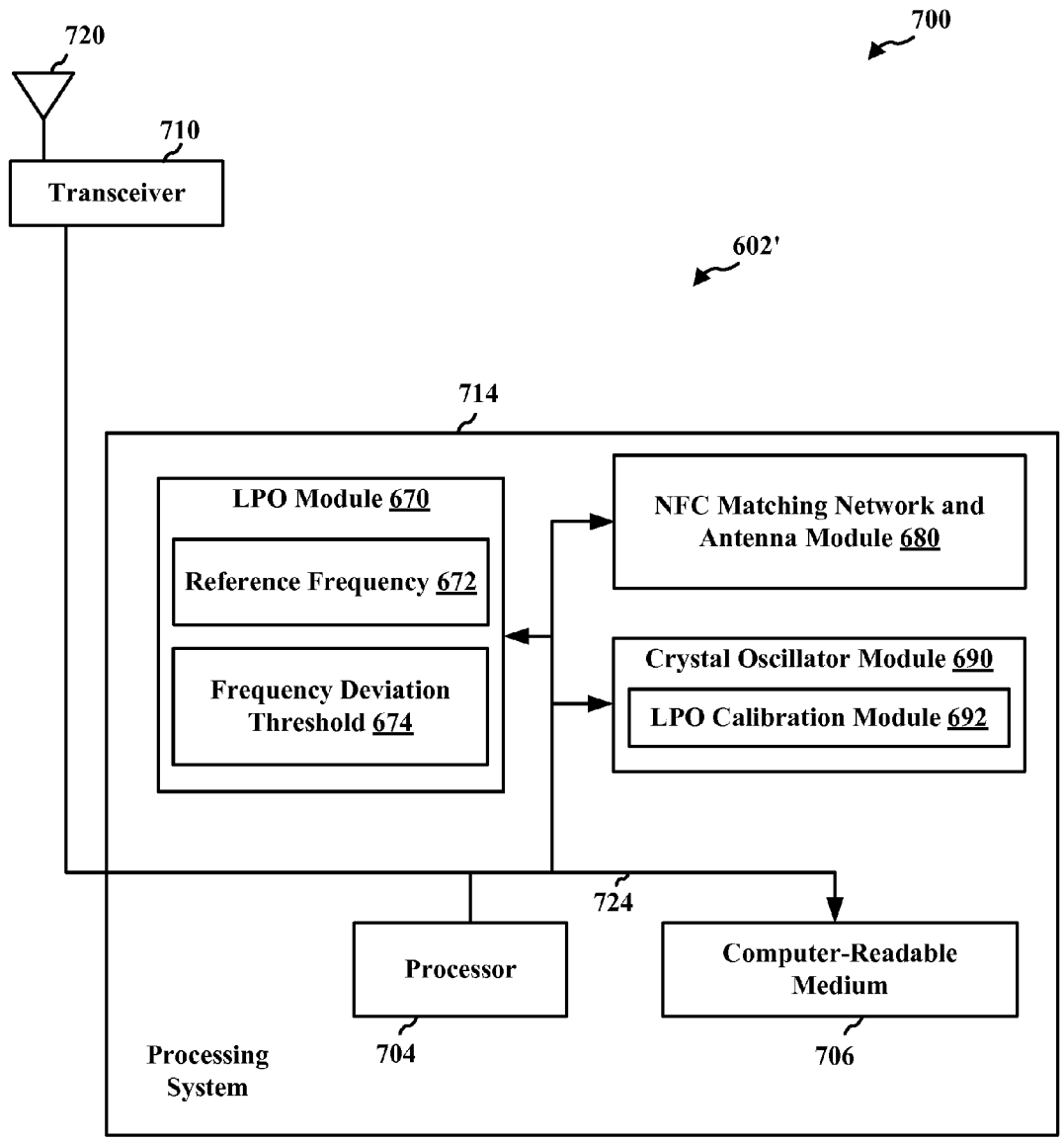
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 670, 672, 674, 680, 690, 692 and the computer-readable medium 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to two or more antennas 720. The transceiver 710 provides a means for communicating with various other apparatus over a transmission medium. The processing system 714 includes a processor 704 coupled to a computer-readable medium 706. The processor 704 is responsible for general processing, including the execution of software stored on the computer-readable medium 706. The software, when executed by the processor 606, causes the processing system 714 to perform the various functions described supra for any particular apparatus. The computer-readable medium 706 may also be used for storing data that is manipulated by the processor 704 when executing software. The processing system further includes at least one of the modules 670, 672, 674, 680, 690, and 692. The modules may be software modules running in the processor 704, resident/stored in the computer-readable medium 706, one or more hardware modules coupled to the processor 704, or some combination thereof. In an aspect, the processing system 714 may be a component of the communications device 600 and may include the memory 608 and/or at least one of transmitter 620, receiver 602, and processor 606.

In a configuration, the apparatus 600/602' for inductive communications includes means for monitoring frequency oscillations associated with a NFC antenna using a calibrated LPO, means for determining that a number of occurrences of the frequency oscillations from a reference frequency is greater than a frequency deviation threshold, and means for performing a NFC polling procedure in response to the determination. In an aspect, apparatus 600/602' may include means for calibrating the LPO using a crystal oscillator. In such an aspect, the crystal oscillator may provide a comparatively higher quality reference clock value to a reference clock value associated with the LPO. In such an aspect, apparatus 600/602' means for monitoring may be further configured to generate the frequency oscillations using the LPO connected to the NFC antenna, and count the number of occurrence using a frequency counter connected to the LPO.

As described supra, the processing system 714 may include the transmitter 620, receiver 602, and processor 606. As such, in one configuration, the aforementioned means may be the transmitter 620, receiver 602, and/or processor 606 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    monitoring frequency oscillations associated with a near field communication (NFC) antenna and a matching network using a calibrated low power oscillator (LPO) connected to the NFC antenna, wherein the monitoring comprises:
        generating the frequency oscillations using the LPO; and
        counting a number of occurrences of the frequency oscillations using a frequency counter connected to the LPO, wherein the frequency oscillations are at a frequency which is a function of an impedance of the NFC antenna;
    determining that the number of occurrences of the frequency oscillations is greater than a frequency deviation threshold from a reference frequency;
    waking up an NFC chip and a crystal oscillator coupled to the NFC antenna and matching network in response to the determination; and
    performing a NFC polling procedure using the NFC chip and the crystal oscillator to determine whether the frequency deviation is based on the presence of a remote NFC device in response to the determination.

2. The method of claim 1, further comprising:
    calibrating the LPO using the crystal oscillator, wherein the crystal oscillator provides a comparatively higher quality reference clock value to a reference clock value associated with the LPO.

3. The method of claim 2, wherein the calibration is performed periodically.

4. The method of claim 2, wherein the calibration is performed when a subsystem that uses the crystal oscillator is activated.

5. The method of claim 2, wherein the calibration is performed once per an integer number of wake-up cycles, wherein the integer is greater than one.

6. The method of claim 1, wherein the monitoring is performed continuously.

7. The method of claim 1, wherein the number of occurrences is averaged over a time duration.

8. The method of claim 1, wherein the reference frequency is adaptively determined based on one or more previously determined values.

9. The method of claim 1, wherein the number of occurrences of the frequency oscillations is based on changes in impedance associated with the NFC antenna.

10. An apparatus for wireless communications, comprising:
    means for monitoring frequency oscillations associated with a near field communication (NFC) antenna and a matching network using a calibrated low power oscillator (LPO) connected to the NFC antenna, wherein the means for monitoring are further configured to:
        generate the frequency oscillations using the LPO connected to the NFC antenna; and
        count a number of occurrences of occurrences of the frequency oscillations using a frequency counter connected to the LPO, wherein the frequency oscillations are at a frequency which is a function of an impedance of the NFC antenna;
    means for determining that the number of occurrences of the frequency oscillations is greater than a frequency deviation threshold from a reference frequency;
    means for waking up an NFC chip and a crystal oscillator coupled to the NFC antenna and matching network in response to the determination; and
    means for performing a NFC polling procedure using the NFC chip and the crystal oscillator to determine whether the frequency deviation is based on the presence of a remote NFC device in response to the determination.

11. The apparatus of claim 10, further comprising:
    means for calibrating the LPO using the crystal oscillator, wherein the crystal oscillator provides a comparatively higher quality reference clock value to a reference clock value associated with the LPO.

12. The apparatus of claim 11, wherein the calibration is performed periodically.

13. The apparatus of claim 11, wherein the calibration is performed when a subsystem that uses the crystal oscillator is activated.

14. The apparatus of claim 11, wherein the calibration is performed once per an integer number of wake-up cycles, wherein the integer is greater than one.

15. The apparatus of claim 10, wherein the monitoring is performed continuously.

16. The apparatus of claim 10, wherein the number of occurrences is averaged over a time duration.

17. The apparatus of claim 10, wherein the reference frequency is adaptively determined based on one or more previously determined values.

18. The apparatus of claim 10, wherein the number of occurrences of the frequency oscillations is based on changes in impedance associated with the NFC antenna.

19. A non-transitory computer-readable medium comprising code for:
monitoring frequency oscillations associated with a near field communication (NFC) antenna and a matching network using a calibrated low power oscillator (LPO) connected to the NFC antenna, wherein the code for monitoring the frequency oscillations comprises code for:
generating the frequency oscillations using the LPO coupled to the NFC antenna; and
counting a number of occurrences of the frequency oscillations using a frequency counter connected to the LPO, wherein the frequency oscillations are at a frequency which is a function of an impedance of the NFC antenna;
determining that the number of occurrences of the frequency oscillations is greater than a frequency deviation threshold from a reference frequency;
waking up an NFC chip including a crystal oscillator coupled to the NFC antenna and matching network in response to the determination; and
performing a NFC polling procedure using the NFC chip and the crystal oscillator to determine whether the frequency deviation is based on the presence of a remote NFC device in response to the determination.

20. The non-transitory computer-readable medium of claim 19, further comprising code for:
calibrating the LPO using the crystal oscillator, wherein the crystal oscillator provides a comparatively higher quality reference clock value to a reference clock value associated with the LPO.

21. The non-transitory computer-readable medium of claim 20, wherein the calibration is performed periodically.

22. The non-transitory computer-readable medium of claim 20, wherein the calibration is performed when a subsystem that uses the crystal oscillator is activated.

23. The non-transitory computer-readable medium of claim 20, wherein the calibration is performed once per an integer number of wake-up cycles, wherein the integer is greater than one.

24. The non-transitory computer-readable medium of claim 19, wherein the monitoring is performed continuously.

25. The non-transitory computer-readable medium of claim 19, wherein the number of occurrences is averaged over a time duration.

26. The non-transitory computer-readable medium of claim 19, wherein the reference frequency is adaptively determined based on one or more previously determined values.

27. The non-transitory computer-readable medium of claim 19, wherein the number of occurrences of the frequency oscillations is based on changes in impedance associated with the NFC antenna.

28. An apparatus for wireless communications, comprising:
a near field communication (NFC) antenna and matching network;
a calibrated low power oscillator (LPO) circuit connected to the NFC antenna and the matching network and configured to monitor frequency oscillations associated with the NFC antenna;
an NFC chip;
a crystal oscillator; and
a processing system coupled to at least one of the LPO circuit or the NFC antenna and matching network and configured to:
generate the frequency oscillations using the LPO connected to the NFC antenna;
count a number of occurrences of the frequency oscillations using a frequency counter connected to the LPO, wherein the frequency oscillations are at a frequency which is a function of an impedance of the NFC antenna;
determine that a number of occurrences of the frequency oscillations is greater than a frequency deviation threshold from a reference frequency;
wake up the NFC chip and the crystal oscillator coupled to the NFC antenna and matching network in response to the determination; and
perform a NFC polling procedure using the NFC chip and the crystal oscillator to determine whether the frequency deviation is based on the presence of a remote NFC device in response to the determination.

29. The apparatus of claim 28, wherein the crystal oscillator is configured to calibrate the LPO, wherein the crystal oscillator provides a comparatively higher quality reference clock value to a reference clock value associated with the LPO.

30. The apparatus of claim 28, wherein the calibration is performed periodically.

31. The apparatus of claim 29, wherein the calibration is performed when a subsystem that uses the crystal oscillator is activated.

32. The apparatus of claim 29, wherein the calibration is performed once per an integer number of wake-up cycles, wherein the integer is greater than one.

33. The apparatus of claim 28, wherein the processing system monitors continuously.

34. The apparatus of claim 28, wherein the number of occurrences is averaged over a time duration.

35. The apparatus of claim 28, wherein the reference frequency is adaptively determined based on one or more previously determined values.

36. The apparatus of claim 28, wherein the number of occurrences of the frequency oscillations is based on changes in impedance associated with the NFC antenna.

* * * * *